United States Patent Office 2,941,960
Patented June 21, 1960

2,941,960

PREPARATION OF MULTIFUNCTIONAL CATALYST

Saul Gerald Hindin, Wilmington, Del., and Sol W. Weller, Drexel Hill, Pa., assignors to Houdry Process Corporation, Wilmington, Del., a corporation of Delaware No Drawing. Filed July 14, 1955, Ser. No. 522,159

4 Claims. (Cl. 252—455)

This invention relates to the preparation of dual-function or multifunction catalysts useful in the treatment of hydrocarbons.

Ordinarily, dual- or multifunction catalysts, particularly those useful in reforming naphthas, are generally prepared by impregnating an activated alumina or similar support in the form of pellets, granules, or the like, with a solution of a compound or compounds of a metal or metals which are to furnish the other catalytic function or one of the other catalytic functions of the catalyst. Thus, a dual-function platinum-type catalyst, for example, is prepared by impregnating an activated alumina support shaped to pellets or the like, with an aqueous solution of a suitable soluble compound of a noble metal of group VIII of the periodic table, e.g., with an aqueous solution of chloroplatinic acid. Such noble metal is then deposited on the support. The resulting catalytic material is dried, and the deposited noble metal compound may be reduced at elevated temperature, if desired or required.

Catalysts of this type have the ability on the one hand to hydrogenate and dehydrogenate certain hydrocarbons by means of the noble metal part of the catalyst and simultaneously, as a result of an acid function, to isomerize, dehydroisomerize, hydrocrack, and to cause dehydrocyclization thereof. To maintain this acid activity of the catalyst, halides or the like acid forming ingredients must be present in the catalyst, and it is, therefore, advisable in the use of such catalysts to add small amounts of halide to the feed. This continual addition of acidic components has however, certain drawbacks such as causing corrosion and/or undesirable chemical compounds formation.

The present invention is concerned with a new process for the manufacture of multifunction catalysts, and it is an object of this invention to obtain in a substantially halide-free condition dual-functional and multifunctional catalysts which are useful in the treatment and conversion of hydrocarbons.

It is a further object of this invention to prepare dual-functional and multifunctional catalysts which upon use in the treatment of hydrocarbons will not require any further addition of halide to maintain their acid catalytic function.

It is still another object of the present invention to prepare dual-functional and multifunctional catalysts which are stable to the influence of steam and which, in contrast to know platimun-alumina-halide catalysts, will retain their acid activity even in the presence of some water contained in the feed stock or otherwise present.

And it is a further object of this invention to prepare dual-functional and multifunctional catalysts in such a manner that the balance between and the nature of their acid and dehydrogenation functions are controlled and may be varied over wide ranges, thus permitting great flexibility in the properties of such catalysts.

Other objects and advantages of the present invention will appear from the following specification and the annexed claims.

In accordance with our present invention, a multifunctional catalyst, e.g., a reforming catalyst for treating naphthas and the like, is prepared by incorporating an acidic oxide with a relatively inert solid material acting as a solid diluent for the acidic oxide, and thereupon impregnating the resulting intimate mixture with a dehydrogenatively active component. By mixing or otherwise incorporating in the preparation of such catalysts acidic oxides with relatively inert materials, hereinafter called supports or carriers, it is possible to control the percentual proportion of the acidic ingredient or ingredients of the catalyst and the balance between the acid and dehydrogenation functions thereof over wide ranges. Such catalysts can thus be prepared with great flexibility to fit widely varied requirements.

Typical acidic oxides useful in the preparation of dual- or multifunctional catalysts in accordance with the present invention are, for example, silica-alumina, silica-zirconia, silica-boria, silica-magnesia, activated clay, and so on, generally characterized as hydrocarbon cracking catalysts and which have catalytic cracking activities of varying degree depending on their nature.

Typical supports for these and other acidic oxides to be employed are, for example, alumina, silica, boria, magnesia, and the like, which have little or no catalytic activity of their own for the conversion of hydrocarbons.

Typical dehydrogenating components useful for the present purpose are, for example, the noble metals of group VIII of the periodic tables, particularly platinum and palladium, but also such metals and compounds as nickel, chromia, molybdena, and so on and having dehydrogenation activity.

In the preparation of catalysts in accordance with the present invention, suitable proportions of one or more of said acidic oxides are intimately mixed in finely powdered condition with suitable proportions of finely powdered substantially inert materials or supports of the indicated type in any convenient manner, e.g., by hand or, still better, in a mechanical mixer or blender. Under suitable circumstances, it is also possible to combine the mixing operation with the pulverizing of one or all of the ingredients of the mixture to be prepared, for example, by means of a ball mill.

On the other hand, it is also possible to mix grains, particles, or powders of different sizes of acid active ingredients and of the relatively inert carrier material with each other in order to meet special requirements.

The mixture thus obtained is then impregnated with a solution of the component or components furnishing dehydrogenating activity. The powder mixture may be treated with this impregnating liquid either directly or after extruding or otherwise shaping the powder to form granules, pellets, spheres, or the like. The mixture of acidic oxide and support or diluting solid material may, however, also be subjected to a pretreatment before said impregnation. Such pretreatment may be advisable to remove, as by acid leaching, alkali metal compounds present, or for reducing the surface area of the material by treatment with high temperature steam; or both or other types of pretreatment may be employed, either simultaneously or one after the other.

The impregnation of the powder, pellets, or the like composed of acidic oxide and support material, if desired after such pretreatment, can be of a nature such that the dehydrogenating component is distributed thereby mainly over the gross outer surface of the oxide mixture, e.g., over and within the outer layers of the shaped particles or pellets thereof. The impregnation may, however, also be carried out by a technique such that the dehydrogenating component is distributed throughout the bulk of the oxide mixture and that a substantially homogeneous catalyst material is obtained.

When preparing, in accordance with the present invention, dual-functional catalysts, for example, noble metal-silica-alumina catalysts useful in reforming naphtha and the like, an aqueous solution of a soluble compound of said noble metal of group VIII of the periodic table, e.g., a solution of chloroplatinic acid, is employed in the impregnating step, and the noble metal is deposited on the powder, pellets, or the like of the acidic oxide-support material mixture. In a corresponding manner, other dehydrogenating components may be incorporated on and into the acidic oxide-support mixture with the use of soluble molybdenum, chromium, and the like compounds, followed by drying and calcination.

Not only the proportions of acidic oxide and substantially inert support or solid diluent but also those of the dehydrogenating constituent of the prepared catalyst may be varied in wide ranges. Thus, such a catalyst may contain, for example, about 1.0% to 50% of acidic oxide and about 0.1% to 4% of noble metal, the balance consisting of substantially inert carrier or support material or solid diluent.

Materials having other catalytic functions may also be incorporated, by mechanically admixing or otherwise, in the product if a multifunctional catalyst is to be prepared.

It is thus possible by the new process to vary in a simple and inexpensive manner the intensities of the different functions relative to each other.

Where the powder mixture of acidic oxide and inert carrier material is impregnated with a dehydrogenating component before pelleting or otherwise shaping, the resulting powder may be kept in stock and may be changed as to its quantitative and/or also its qualitative constitution by the admixture of more of one or the other of the ingredients before pelleting or the like, thus to influence the course of a desired reaction by the catalyst and to drive it in a desired direction.

Catalysts obtained by impregnation and deposit of a noble metal compound on a mixture of acidic oxide and support material, pelleted before or after such impregnation, may be used as such or after reduction of the deposited noble metal with hydrogen at elevated temperature. In the former case, such reduction will take place in the initial stage of the dehydrogenation operation on reforming naphthas or the like.

Wherever the catalyst produced in accordance with the process of the present invention contains halides or the like, due for example to an impregnation of the acidic oxide-support mixture with chloroplatinic acid, it is often advisable to subject the resulting catalyst to a steaming operation in order to hydrolyze and remove the halogen present. This steaming may, for example, be carried out with 100% steam or with a mixture of about 50–95% steam and about 50–5% hydrogen at temperatures in the range of about 600–1000° F. for a period of about one to five hours. The completeness of the halogen removal is a function of the period of steaming. At least two volumes of water as steam per volume of catalyst per hour are preferably used in this steaming operation. The chloride or the like content of the catalyst can thus be reduced to about 0.1% or less.

By such treatment, any acid function of the catalyst due to a halide content thereof can be lowered to a non-controlling or ineffective level so that the acid function of the final catalyst will derive mainly and controllably from its acidic oxide component. The possibility of too high an acid function due to the presence of extraneous halide acid function causing too much cracking and coke formation of hydrocarbons under treatment is thus avoided, and the acid function of the catalyst is controlled by the proportion of acidic oxide incorporated in the catalyst.

On the other hand, no addition of halide with the feed or otherwise is required in the use of a catalyst prepared in accordance with the present invention to maintain its acid function. This is in contrast to known dual-function catalysts of the platinum-alumina-halide type as, for example, described in U.S. Patent 2,479,110, which require such halogen or halide addition particularly in the treatment of water-containing feeds. Since the addition of halogen or halide in turn may result in serious corrosion problems and/or lead to a deposition of ammonium chloride in condensers if nitrogen compounds are present in the feed stock, the avoidance of the use of halide or halogen is highly desirable. While in the usual platinum-alumina-halide catalysts the acid activity substantially decreases in the presence of water, a catalyst prepared by the new process effectively will retain its acid activity in such a case, as the acid function thereof is entirely built in with the acidic oxide ingredient.

*Example*

A fine powder of commercially prepared silica-alumina catalyst material containing proportions of about 85% silica and 15% alumina with relatively small amounts of extraneous compounds including alkali metal compounds was leached with an aqueous solution of acetic acid to effect a substantial reduction in the residual traces of free alkali metal compounds, washed and dried at about 220° F. until any free water had been substantially removed.

Thirty parts by weight of this material were added to 170 parts by weight of alumina trihydrate in a mixing-mulling machine (Lancaster mixer). To this dry material, about 40 parts by weight were added of an aqueous solution of aluminum nitrate, Al(NO$_3$)$_3$, (specific gravity 1.227) containing in suspension one part by weight of Volclay, and the resulting conglomerate was mulled for about one hour with gradual admixture of an additional amount of 32 parts by weight of the aqueous solution of aluminum nitrate without Volclay.

The resulting thoroughly mixed material was extruded into strands and cut into pellets of about 4 mm. in length and 4 mm. in diameter. The pellets were dried for about one hour at 240° F. and were subsequently brought up to a temperature of about 600° F. in a furnace. After about six hours at 600° F., the temperature was raised to about 800° F. and maintained at this temperature for about two hours. Eventually, the pellets were heated at about 1050° F. for one hour in a stream of dry air.

After cooling, the pellets were leached with a 10% aqueous acetic acid solution, water washed, dried for one hour at 240° F., and then heat treated at 1050° F. for two hours in flowing dry air.

The cooled material was impregnated with platinum-containing material by immersion in chloroplatinic acid solution of sufficient volume and concentration to give about 0.5% platinum by weight of the final catalyst. After drying the catalyst material for two hours at 240° F., its temperature was raised to 900° F. and maintained at this temperature for an additional 30 minutes in an atmosphere of flowing hydrogen. Thereafter and still at 900° F., steam was added with the hydrogen in volume proportions of about 65% and 35%, respectively, and the treatment was continued for further five hours.

The finished catalyst contained less than 0.1% of chloride, as shown by analysis.

The catalyst thus obtained was tested in the reforming of an East Texas straight run naphtha boiling in the range of about 250° F. to 400° F. and having an octane number of 40 F–1 clear. This naphtha contained about 44% naphthenes, about 15% aromatics and about 41% paraffins. In the following table, the results obtained in the reforming of this naphtha at the indicated temperatures with the use of the catalyst obtained in accordance with the above-described example and shown at catalyst A are compared with those obtained with the use of a normal dual-functional platinum-alumina-chloride catalyst B. The conditions of the test included a pressure of 600 pounds per square inch, a liquid hourly space rate of 4 volumes of naphtha per volume of catalyst, and a hydrogen to oil ratio of 6 moles.

| Temperature | Octane Number, F-1 Clear | | | $C_4+$ Yield, percent by weight of charge | | |
|---|---|---|---|---|---|---|
| | 900° F. | 925° F. | 950° F. | 900° F. | 925° F. | 950 °F. |
| With Catalyst A | 87 | 90.4 | 94.8 | 94.3 | 92.8 | 90.5 |
| With Catalyst B | 81 | 87 | 93 | ~92 | ~91 | ~88 |

As shown by this table, the $C_4+$ yields at all temperatures were somewhat higher with the catalyst A in accordance with the present invention than with the normal platinum-alumina-chloride catalyst B, and the octane numbers, too, were higher at all testing temperatures for catalyst A. Apart from these comparative results with respect to octane number and yield, it is to be considered that catalyst A prepared in accordance with this invention is substantially free of halide and, therefore, less sensitive to the presence of water in the feed and to steam treatment than catalyst B.

It is obvious that the proportions of the acidic oxide and the relatively inert carrier material may depart from those given in the example and may vary in wide ranges according to requirements and desires, just as the amount of the dehydrogenating component incorporated in the catalyst may be changed, and that any other acidic oxide, any other relatively inert diluting carrier material, and any other dehydrogenating component may be used instead of those of the example. The pretreatment of the silica-alumina or other acidic oxide, just as that of the carrier material may also be changed. Thus, it is possible preliminarily to mix the acidic oxide with the relatively inert powdered support, to pellet the mixture and then to subject the resulting pellets to acid leaching and surface area reduction, or vice versa. Impregnation of the mixture of acidic oxide and carrier material with the dehydrogenating component may also be carried out while said mixture is still in powder form, and the pelleting or otherwise shaping of the catalyst may follow the impregnation. In the latter embodiment of the invention, the dehydrogenating component will generally be distributed more homogeneously throughout the bulk of the mixture.

Numerous other variations of the described process may be made without departing from the spirit and scope of the invention as defined in the annexed claims.

What we claim is:

1. The method of preparing stable dual-function reforming catalyst which comprises: admixing a major portion of an inert support with a minor portion of an acidic solid siliceous cracking catalyst furnishing one of said functions, forming said admixture into discrete particles and thereafter incorporating a dehydrogenating component into said particles to furnish the other of said functions; said inert support being composed of alumina, and said dehydrogenating component being selected from the group consisting of platinum, palladium, nickel, and the oxides of chromium and molybdenum.

2. A process in accordance with claim 1 wherein said cracking catalyst is at least one of the group consisting of silica-alumina, silica-zirconia, silica-boria, silica-magnesia, and activated clay.

3. A process in accordance with claim 1 wherein said dehydrogenating component is platinum in an amount in the range of 0.1% to 4% by weight of the final catalyst.

4. A process for the preparation of a dual-functional reforming characterized in that one of said functions has acidity of controlled magnitude independent of extraneous sources during reforming operations, said process comprising intimately admixing powdered alumina trihydrate in a ratio of about five parts by weight with one part by weight of powdered silica-alumina cracking catalyst, compositing said admixture into pellets, impregnating said pellets with an aqueous solution of chloroplatinic acid in an amount depositing the equivalent of about 0.1 to 4% by weight of platinum, drying said impregnated pellets, treating said dried pellets at reducing conditions to convert substantially all of said platinum to metallic form, further treating said reduced pellets at a temperature in the range of 600–1000° F. with a gas stream comprising steam and 5 to 50% hydrogen for a time in the range of one to five hours, and recovering said treated pellets as dual-functional catalyst having as one of said functions stable acidity provided by said cracking catalyst component.

References Cited in the file of this patent
UNITED STATES PATENTS

| | | |
|---|---|---|
| 2,340,934 | Connolly | Feb. 8, 1944 |
| 2,455,713 | Voorhies | Dec. 7, 1948 |
| 2,478,916 | Haensel | Aug. 16, 1949 |
| 2,487,065 | Milliken | Nov. 8, 1949 |
| 2,502,930 | Daussat et al. | Apr. 4, 1950 |
| 2,517,036 | Seusel et al. | Aug. 1, 1950 |
| 2,642,383 | Berger | June 16, 1953 |
| 2,662,860 | Engel et al. | Dec. 15, 1953 |
| 2,662,861 | Riblett et al. | Dec. 15, 1953 |
| 2,739,944 | Kearby | Mar. 27, 1956 |
| 2,746,937 | Hunter | May 22, 1956 |
| 2,854,401 | Weisz | Sept. 30, 1958 |